(12) United States Patent
Tsuruoka et al.

(10) Patent No.: US 7,058,051 B2
(45) Date of Patent: Jun. 6, 2006

(54) PACKET PROCESSING DEVICE

(75) Inventors: Tetsumei Tsuruoka, Kawasaki (JP); Yuji Kojima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1011 days.

(21) Appl. No.: 09/942,216

(22) Filed: Aug. 29, 2001

(65) Prior Publication Data

US 2002/0071433 A1 Jun. 13, 2002

(30) Foreign Application Priority Data

Dec. 8, 2000 (JP) .............................. 2000-373732

(51) Int. Cl.
*H04L 11/00* (2006.01)
*H04L 12/56* (2006.01)

(52) U.S. Cl. ...................... 370/388; 370/389; 370/392
(58) Field of Classification Search ................ 370/401, 370/389, 392, 388, 473, 474
See application file for complete search history.

(56) References Cited

U.S. PATENT DOCUMENTS

| 5,128,932 A | * | 7/1992 | Li ............................... 370/236 |
| 5,841,988 A | | 11/1998 | Chennubholta et al. |
| 6,157,955 A | | 12/2000 | Narad et al. |
| 6,335,992 B1 | * | 1/2002 | Bala et al. ..................... 385/17 |
| 6,427,039 B1 | * | 7/2002 | Hakimi et al. ................ 385/24 |
| 6,438,368 B1 | * | 8/2002 | Phillips et al. .............. 455/403 |
| 6,490,260 B1 | * | 12/2002 | Hwang ........................ 370/335 |
| 6,493,124 B1 | * | 12/2002 | Haberkorn ................... 398/45 |
| 6,763,015 B1 | * | 7/2004 | Phillips et al. .............. 370/347 |

FOREIGN PATENT DOCUMENTS

JP 2000349816 12/2000

* cited by examiner

*Primary Examiner*—Chi Pham
*Assistant Examiner*—Ronald Abelson
(74) *Attorney, Agent, or Firm*—Katten Muchin Rosenman LLP

(57) ABSTRACT

A packet processing device capable of restraining overhead and processing packets at high speed. Packet input section is input a packet, and internal information handover section hands over internal information of a packet processor. Packet computing section computes the input packet in accordance with the internal information, and packet output section outputs the computed packet. A communication line connects such packet processors in series.

7 Claims, 6 Drawing Sheets

PACKET PROCESSING DEVICE

BACKGROUND OF THE INVENTION (1) Field of the Invention

The present invention relates to a packet processing device, and more particularly, to a packet processing device for processing packets in conjunction with a communication network.

(2) Description of the Related Art

In recent years, computers and various other information processing devices are interconnected by networks, expanding the scale of communication systems. Among networks constructing communication systems, IP (Internet Protocol) network is currently the most prevalent one. IP is a connectionless protocol corresponding to the Network layer.

Packet processing for such an IP network involves packet filtering for restricting communications through the network, in addition to processes necessary for relaying packets, such as checksum calculation for packet headers, search of destination table, and updating of packet headers.

These processes are too complicated to be implemented by dedicated hardware, and also since the procedure is subject to change because of the revision of the protocol itself, conventionally the processes were usually implemented by software with the use of a processor.

For example, a processor and a memory are connected by a bus, and the program stored in the memory is executed by the processor to process packets.

In such packet processing, however, memory access for reading/writing data from/into the memory increases overhead, and also due to the limitations of access bandwidth of the memory itself, it was difficult to speed up the packet processing.

In view of the circumstances, Japanese Unexamined Patent Publication No. 2000-349816 proposes a series connection of packet processors each including a packet access register for directly reading in packet data.

With this arrangement, the result of packet processing by a packet processor of a preceding stage is input to the succeeding-stage packet processor, so that individual packets are subjected to a pipeline process.

By constructing such a pipeline processing system, it is possible to process packets more efficiently than the conventional arrangement wherein a processor and a memory are connected to each other.

Even with the second-mentioned conventional technique of carrying out the packet processing separately by serially connected processors having packet input-output sections, a problem arises in that the performance cannot be enhanced up to a level corresponding to the number of the processors connected.

Where the packet processing is performed by separate processors, it is necessary that an intermediary processing status should be handed over from a preceding-stage processor to a succeeding-stage processor, and conventionally, the necessary information is handed over as parameters. Thus, the preceding-stage processor is required to generate parameters while the succeeding-stage processor is required to interpret and recognize the parameters.

For example, in cases where packets are processed separately according to their protocol types, the process of analyzing packet headers to identify the protocol types and the process to be executed with respect to a specific protocol are assigned to separate processors.

As a consequence, the preceding-stage processor needs to convert values indicative of the identified protocol to parameters before transmitting the results to the succeeding stage, and the succeeding-stage processor needs to make a comparison to determine whether or not the protocol indicated by the parameters is the one to be processed thereby.

Processing overhead like this exerts a greater influence upon the throughput as the required throughput increases. For example, in the case where a process involves five steps, the overhead is 5% if the allowable processing time of each processor is 100 steps in terms of the number of instruction steps, but reaches 50% if the allowable processing time becomes 10 steps. Where an even higher throughput is required, the overhead accounts for nearly all of the process performed.

Accordingly, even if processors are arranged to constitute a pipeline structure and a process to be executed is divided into a plurality of processing stages to restrain the processing load on each processor, the overhead can still increase as mentioned above so long as the handover of information between processors is performed in a generalized form using parameters, as in the conventional technique.

SUMMARY OF THE INVENTION

The present invention was created in view of the above circumstances, and an object thereof is to provide a packet processing device capable of restraining the overhead and thereby permitting high-speed processing of packets.

To achieve the above object, there is provided a packet processing device for processing packets. The packet processing device comprises a plurality of packet processors each including packet input means to which a packet is input, internal information handover means for handing over information in the corresponding packet processor as internal information, packet computing means for computing the input packet in accordance with the internal information and packet output means for outputting the computed packet, and a communication line connecting the packet processors in series.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
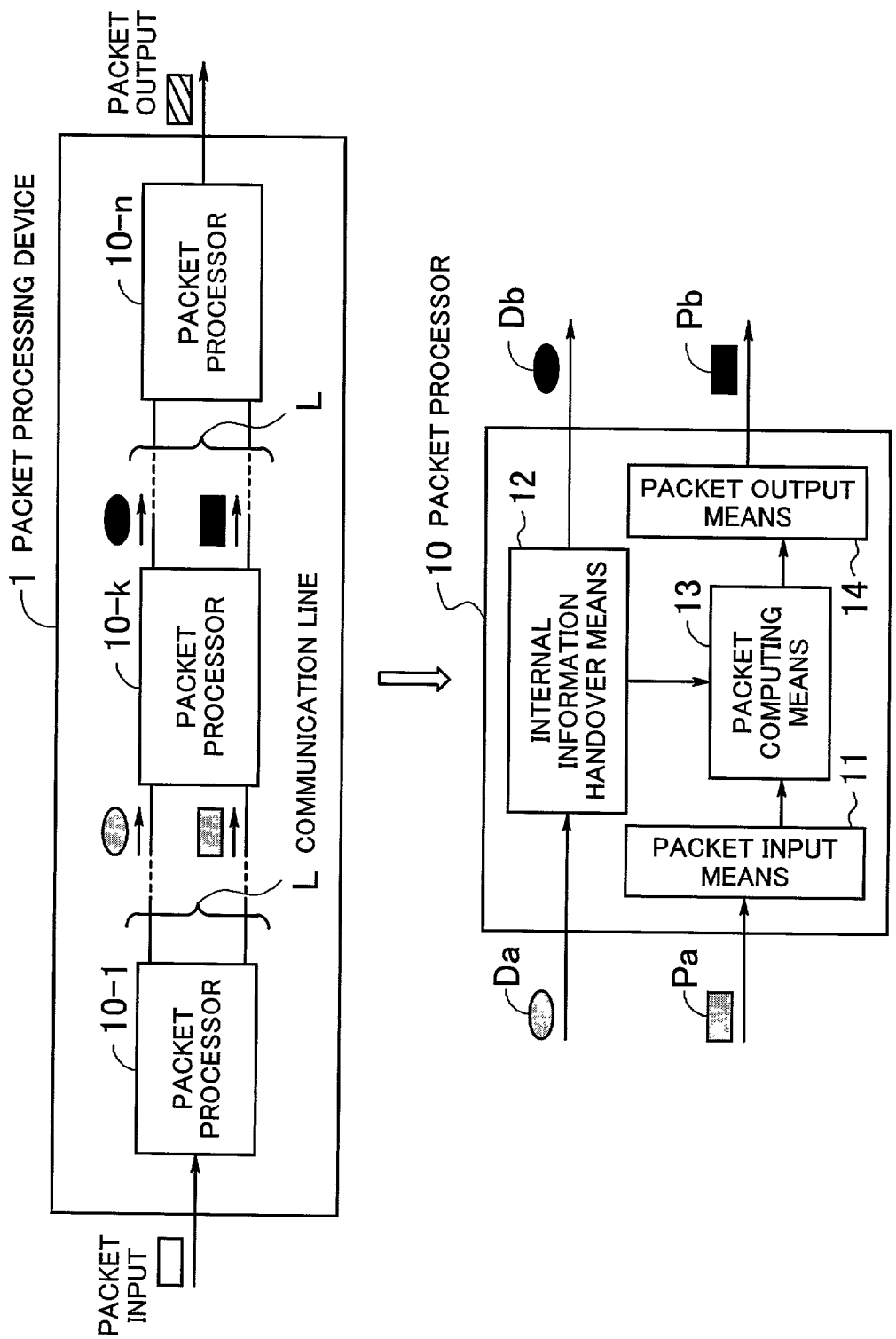
FIG. 1 is a diagram illustrating the principle of a packet processing device according to the present invention.

Embodiments of the present invention will be hereinafter described with reference to the drawings. FIG. 1 illustrates the principle of a packet processing device according to the present invention. The packet processing device 1 includes packet processors 10-1, . . . , 10-k, . . . and 10-n, which are connected in series (concatenated) by a communication line L to constitute a pipeline processing structure.

In the packet processors 10-1, ..., 10-k, ... and 10-n (referred to generally as the packet processor 10), a packet is input to packet input means 11.

Internal information handover means 12 controls the handover of internal information of the corresponding processor as internal information. Specifically, the internal information handover means hands over the internal information transmitted thereto from the preceding-stage packet processor, and also transmits the internal information of its corresponding processor to the succeeding-stage packet processor.

The internal information referred to herein is not parameters which are generated by converting the internal status, as used in the conventional technique, but denotes information directly indicative of the internal execution status of the packet processor. According to the present invention, this type of internal information is handed over between the processors, whereby the parameter generation, parameter interpretation/recognition, etc. are unnecessary, making it possible to reduce the overhead.

Packet computing means 13 computes the input packet in accordance with the internal information received from the preceding stage. Packet output means 14 outputs the computed packet to the succeeding stage.

Internal information Da appearing in FIG. 1 denotes the internal information received from the preceding stage. Internal information Db is indicative of the internal execution status of the packet processor 10 and is transmitted to the succeeding stage. A packet Pa is the packet processed by the preceding stage, and a packet Pb is the packet which has been processed by the packet processor 10 and is being transmitted to the succeeding stage.

Figure 2:
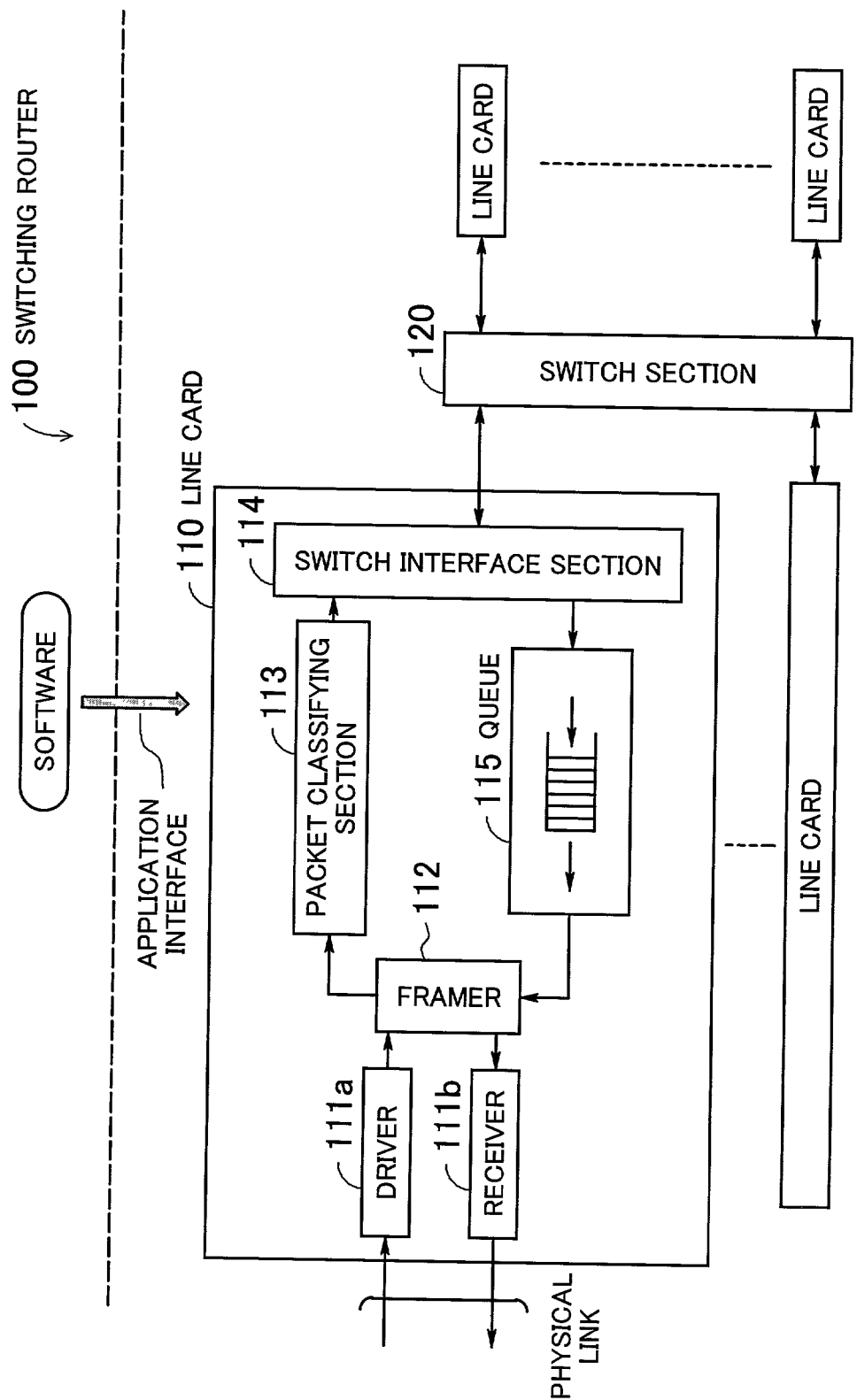
FIG. 2 is a diagram illustrating a configuration of a switching router.

As an example of device to which the packet processing device 1 according to the present invention is applied, a switching router will be described. FIG. 2 illustrates the configuration of a switching router.

The switching router 100 includes a plurality of line cards and a switch section 120, of which the operation settings are made by software through an application interface.

In the line card 110, a receiver 111b converts data received from a physical link into a data stream, and a framer 112 extracts a packet from the data stream.

A packet classifying section 113 performs classification of the extracted packet, such as identification of a location to be routed. Also, the packet classifying section determines the destination and required quality control, and hands over the packet to the switch section 120 via a switch interface section 114. The switch section 120 relays the packet to the output location specified by the packet classification process.

The line card 110 also receives packets through the switch interface section 114 from the switch section 120. The line card converts a packet in a queue 115 into a form matching the framing process as well as the physical link of the Physical layer, in accordance with the packet classification result, and sends the packet onto the physical link through the framer 112 and a driver 111a.

In this switching router 100, the function of the packet processing device 1 of the present invention is utilized in the packet classifying section 113. Using the function, the packet classifying section 113 identifies the protocol type of packet, identifies the destination based on the packet header, supplies the switch interface section 114 and the switch section 120 with the packet as well as information indicating the location to be routed, and also determines applicable quality control in accordance with the packet content.

Figure 3:
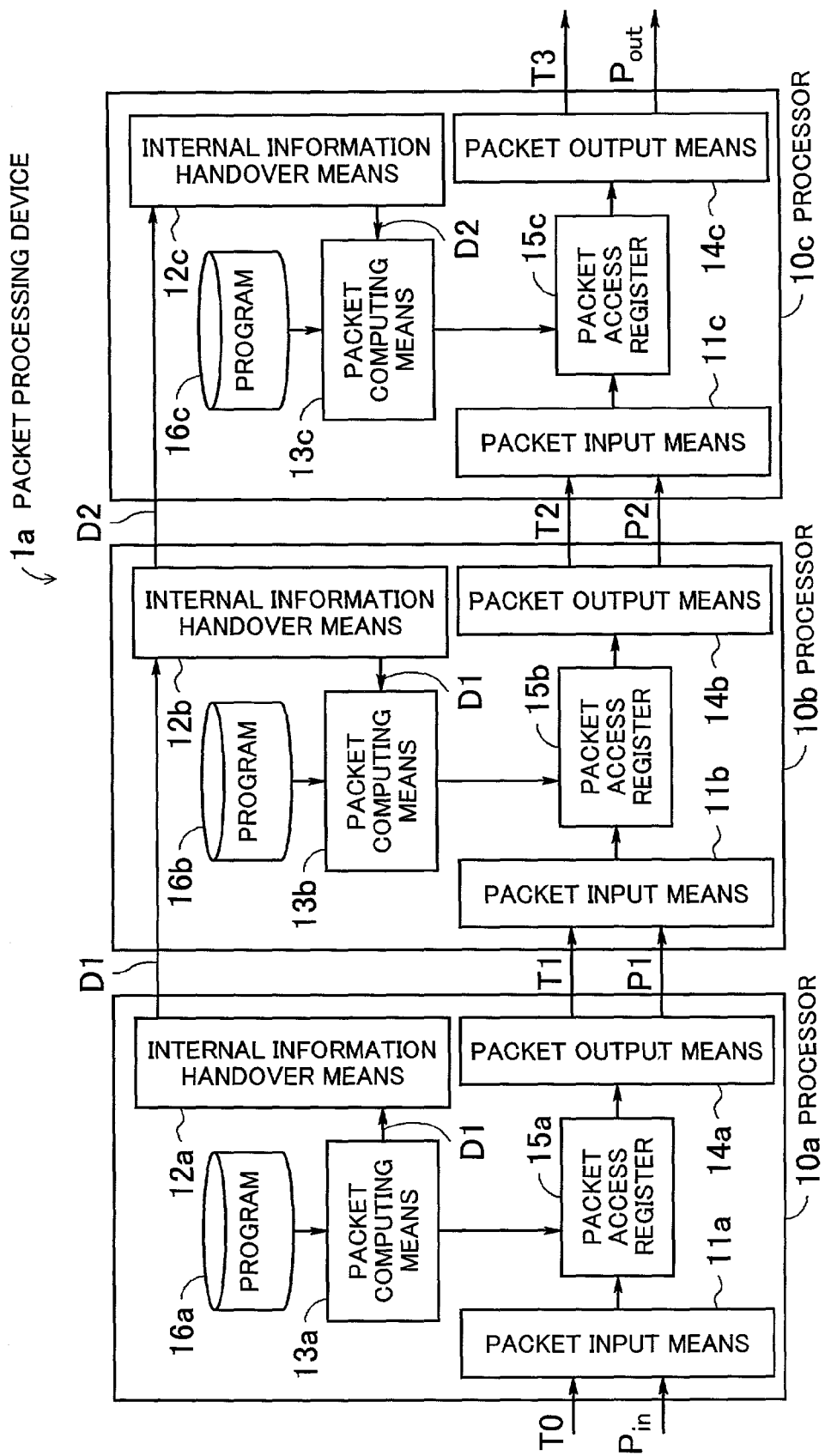
FIG. 3 is a diagram illustrating a configuration of a packet processing device including three stages of packet processors.

The following is a detailed description of operation (first embodiment) of the packet processing device 1 according to the present invention. FIG. 3 illustrates the configuration of a packet processing device including three stages of packet processors.

The packet processing device 1a includes packet processors (hereinafter merely referred to as processors) 10a to 10c, each of which starts a processing program synchronously with timing at which a packet arrives at a corresponding one of packet input means 11a to 11c. In the figure, the packet arrival timing is transmitted as a separate signal (packet arrival timings T0 to T3).

The processors execute respective processes as time elapses (with progress of cycles of the internal clock), in accordance with programs (or microcodes) 16a to 16c which the respective processors own. After executing a process corresponding to an allowable processing time (e.g., four cycles) determined by the processing throughput, each processor stops processing the packet in accordance with the program.

The input packet is forwarded to packet output means 14a–14c via a packet access register 15a–15c with a shift register structure, both provided in the processor. Synchronously with packet output timing, packet arrival timing is output to the succeeding stage.

In this case, after the packet processing, internal information handover means 12a–12c hands over the internal information of the preceding-stage processor to the succeeding-stage processor in synchronism with the output of the packet arrival timing to the succeeding-stage processor. The succeeding-stage processor reads in the internal information synchronously with the packet arrival timing.

As a consequence, although in actuality the succeeding-stage processor starts packet processing anew, it can take over the packet processing of the preceding-stage processor since the information about the execution status of the preceding-stage processor has been handed over to the succeeding-stage processor.

The above operation will be explained taking as an example the three-stage packet processing system shown in FIG. 3. The first-stage processor 10a receives input packet data Pin through the packet input means 11a and, in synchronism with packet arrival timing T0 indicative of the beginning of the packet, starts the processing program of its own.

In this case, since the processor 10a is the first processor, there is no internal status handed over from the preceding-stage processor.

The packet data Pin is transferred via the packet access register 15a inside the processor 10a to the packet output means 14a with a certain latency. During the transfer, packet computing means 13a processes the packet in accordance with the program 16a and ends the packet processing upon lapse of the allowable processing time determined by the processing throughput.

The packet output means 14a outputs the packet P1 processed by the processor 10a as well as packet arrival timing T1 to the processor 10b. At this time, the internal information handover means 12a outputs internal information D1 indicative of the internal status of its corresponding processor 10a.

The second-stage processor 10b receives the output from the packet output means 14a of the processor 10a through the packet input means 11b, and starts its own processing program in synchronism with the packet arrival timing T1.

Prior to starting the program, the processor 10b reads in the internal information D1 output from the processor 10a and sets the information as its own internal status.

In the processor 10b, the packet data P1 is transferred via the packet access register 15b to the packet output means 14b with a certain latency. During the transfer, the packet computing means 13b processes the packet in accordance with the program 16b and ends the packet processing upon lapse of the allowable processing time determined by the processing throughput.

The packet output means 14b outputs the packet P2 processed by the processor 10b as well as packet arrival timing T2 to the processor 10c. At this time, the internal information handover means 12b outputs internal information D2 indicative of the internal status of its corresponding processor 10b.

The third-stage processor 10c receives the output from the packet output means 14b of the processor 10b through the packet input means 11c, and starts its own processing program in synchronism with the packet arrival timing T2.

Prior to starting the program, the processor 10c reads in the internal information D2 output from the processor 10b and sets the information as its own internal status.

In the processor 10c, the packet data P2 is transferred via the packet access register 15c to the packet output means 14c with a certain latency. During the transfer, the packet computing means 13c processes the packet in accordance with the program 16c and ends the packet processing upon lapse of the allowable processing time determined by the processing throughput.

Then, the packet output means 14c outputs the packet Pout processed by the processor 10c as well as packet arrival timing T3 to outside. In this case, since the processor 10c is the last-stage processor in the packet processing system, internal information D3 (not shown) of the processor 10c need not be output.

Figure 4:
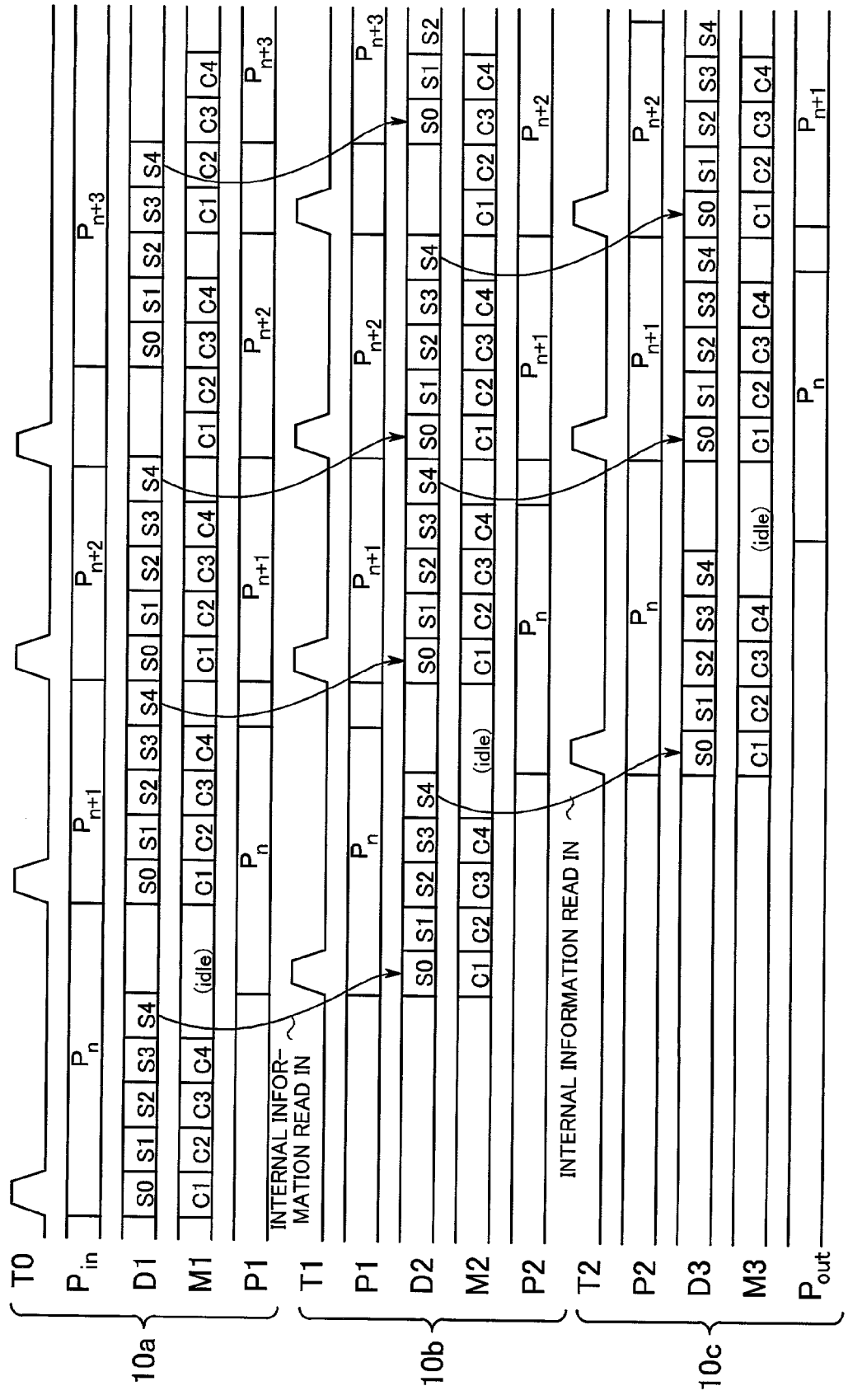
FIG. 4 is a timing chart illustrating handover of internal information in the packet processing device.

FIG. 4 is a timing chart illustrating the handover of the internal information in the packet processing device 1a. FIG. 4 shows, with respect to the individual processors 10a to 10c, the packet arrival timings T0 to T2, input packet data Pin, P1 and P2, internal information D1 to D3, execute instructions M1 to M3, and output packet data P1, P2 and Pout.

Referring to FIG. 4, the handover of the internal information will be explained. The processor 10a processes the packet data Pin in accordance with execute instructions C1 to C4 and outputs packet data P1. Internal statuses corresponding to the execute instructions C1 to C4 are indicated at S0 to S3, respectively, and an internal status S4 is handed over to the succeeding-stage processor 10b. The processor 10b takes over the status to process the packet data P1 (The internal status S4 of the processor 10a corresponds to the internal status S0 of the processor 10b). This is the case with the subsequent handover operations.

A second embodiment will be now described. In the second embodiment, a status flag is handed over as the internal information between processors. The processor 10 includes a status flag which is set/cleared in accordance with instruction execution results, and executes different instructions in accordance with the status flag value. After executing each instruction, the processor 10 evaluates the result of execution and updates the status flag value.

The flag value includes carry, zero, etc., for example, and when a carry occurs as a result of the execution of an instruction, the processor 10 sets a carry flag. Conditional branch instruction and conditional execute instruction are examples of instruction wherein different instructions are executed in accordance with the flag value.

Specifically, in the case of a conditional branch instruction, the process is resumed from the specified instruction if the specified flag value fulfills the specified conditional value. A conditional execute instruction is executed if the specified flag value fulfills the specified conditional value, and is not executed (this is equivalent to "no operation" in terms of operation since the instruction clock cycle is consumed) if the specified flag value does not fulfill the specified conditional value.

The status flag value as mentioned above is handed over as the internal information, and this enables separate processors to take part in a process. For example, the preceding-stage processor may execute the process up to a flag value discrimination process and the succeeding-stage processor may perform a different process in accordance with the result of the flag value discrimination.

Figure 5:
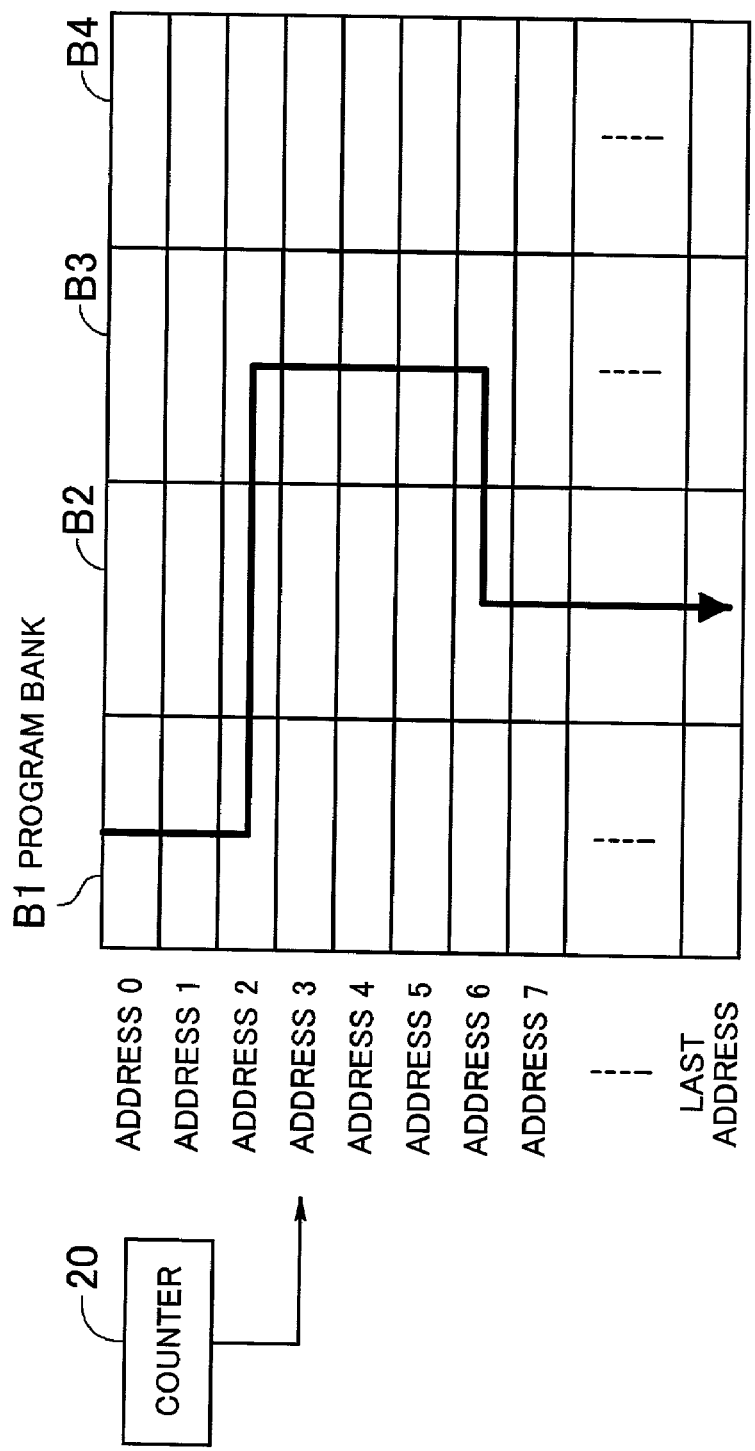
FIG. 5 is a diagram illustrating program banks.

A third embodiment will be now described. In the third embodiment, bank information is handed over as the internal information. FIG. 5 illustrates program banks.

The processor 10 stores an instruction procedure separately in a plurality of program banks, and switching of the program banks is performed in accordance with a program bank switch instruction in the instruction procedure. On execution of a switch instruction, the process jumps to an address specified by the instruction and is continued from this address of program. Operation like this is repeatedly executed up to the last address.

FIG. 5 shows switching of instructions among program banks B1 to B4 in accordance with an address specified by a counter 20. First, instructions stored in addresses "0" to "2" of the program bank B1 are executed, and then the process switches to address "2" of the program bank B3.

Subsequently, instructions stored in addresses "2" to "6" of the program bank B3 are executed, whereupon the process switches to address "6" of the program bank B2 and the instructions of the program bank B2 up to the last address are executed.

The aforementioned program bank switching can be applied to a branch process in such a manner that the individual processors process packets differently by executing different instructions according to the input packet formats, for example. In this case, the program bank address may be handed over between processors as the internal information, whereby efficient pipeline processing can be performed.

A fourth embodiment will be now described. In the fourth embodiment, information stored in a local register is handed over as the internal information. The processor 10 is provided with a local register (included in, e.g., the packet computing means 13) for holding the computation results internally.

In the case of modifying a value of a specific field fetched from a packet, for example, the specific field is extracted from a packet and modified, and the result of modification is stored in the local register. The modification result stored in the local register is then handed over to the succeeding-stage processor as the internal information and is again modified therein.

By thus handing over the information stored in the local register as the internal information, it is possible to perform pipeline processing with high efficiency.

A fifth embodiment will be now described. In the foregoing description is exemplified a case where the processes of the individual processors do not overlap with each other on the time base. In the fifth embodiment, of two adjacent processors, the succeeding-stage processor starts the packet processing before the preceding-stage processor uses up the processing time permitted by the packet throughput.

Suppose, for example, a case where the packet storage time of the individual processors is shorter than the processing time permitted by the packet throughput. In this case, even if the internal processing status of the preceding-stage processor is handed over to the succeeding-stage processor after completion of the packet processing of the preceding-stage side, the packet processing of the succeeding-stage side is then already started, making the handover impossible.

However, if all necessary information is available at the time when the packet processing is started on the succeeding-stage side even though all of the process of the preceding-stage side is not yet completed, the internal status of the preceding-stage side may be handed over to the packet processing of the succeeding-stage side, thus permitting the preceding-stage processor to continue the remaining packet processing. In this case, the remaining process that the preceding-stage processor is allowed to perform is a process which has no relevance to the internal status handed over to the succeeding-stage processor.

In the first embodiment, the internal information is notified synchronously with completion of the packet processing, but in the fifth embodiment, the timing for starting the process of notifying the succeeding-stage side of the internal status of the preceding-stage processor is generated before the packet processing is completed.

Specific methods include, for example, a method wherein fixed notification timing is determined in accordance with the packet latency caused in the individual processors, and a method wherein the internal information is output to the succeeding-stage side synchronously with the execution of a certain cycle of the program after the start thereof.

A sixth embodiment will be now described. In the first to fifth embodiments, the internal information is always handed over between processors, but in some cases the handover of the internal information can cause inconvenience.

Specifically, where the processes to be executed by adjacent processors have low relevance or continuity, efficient packet processing cannot be performed if the information of the preceding stage is handed over to the succeeding stage.

For example, in cases where the preceding-stage processor use different program banks for different processing protocols while the succeeding-stage processor performs protocol-independent process, the handover of values of the program banks, if performed, makes it necessary to describe the same program instruction in the individual program banks, which leads to poor efficiency.

In the sixth embodiment, therefore, whether the internal information should be handed over or not can be set as needed, thus permitting packets to be processed optimally in accordance with the form of processing.

Figure 6:
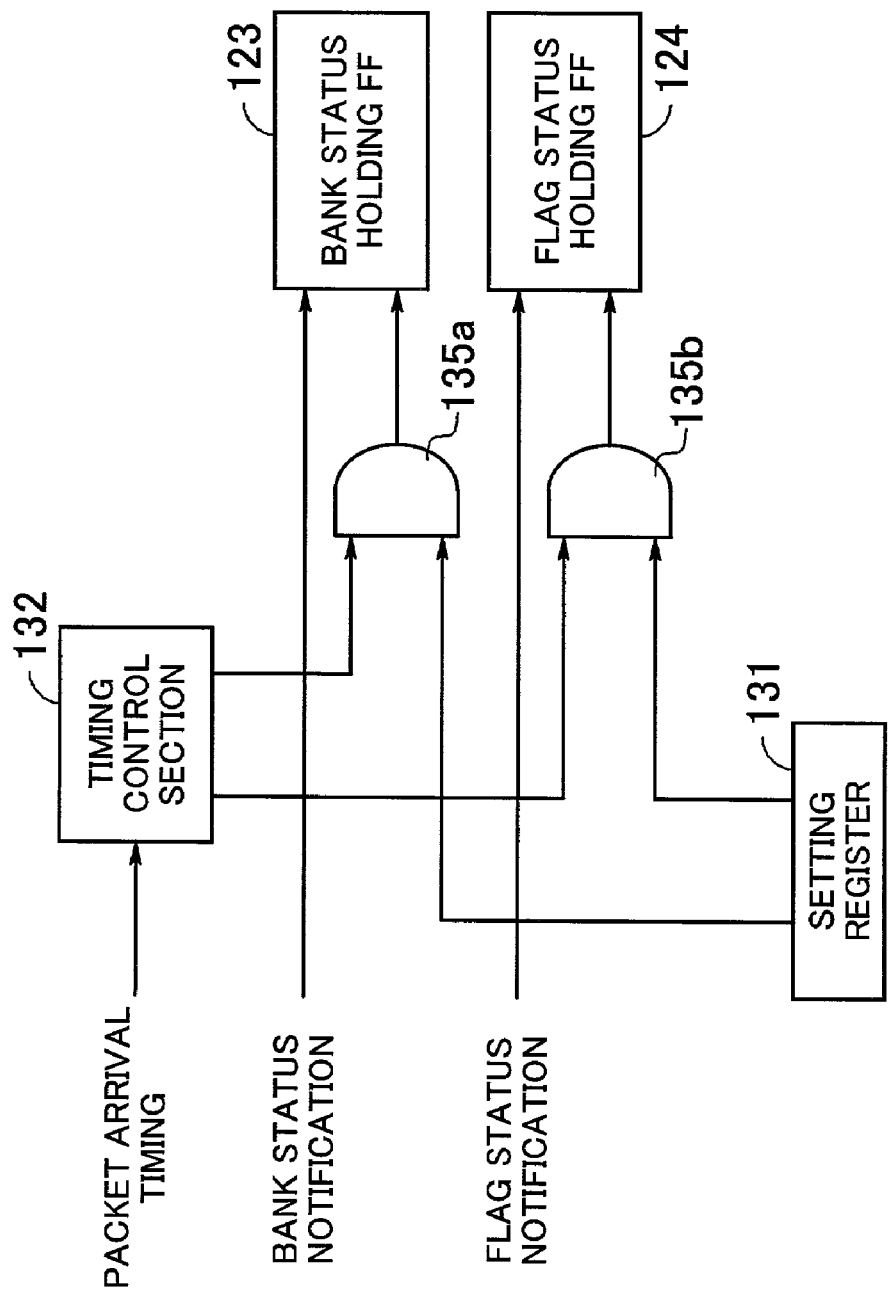
FIG. 6 is a diagram illustrating a configuration for selective handover control of the internal information.

FIG. 6 illustrates the configuration for selective handover control of the internal information. In the illustrated example, the program bank address and the status flag can be set independently of each other as to whether they should be handed over from the preceding stage.

A setting register 131 holds information as to whether the internal information should be handed over or not, and sends the information to AND elements 135a and 135b. A timing control section 132 receives the packet arrival timing, retimes the received timing, and transmits the result to the AND elements 135a and 135b as an internal information update timing signal.

A bank status holding Flip-Flop (FF) 123 and a flag status holding FLIP-FLOP (FF) 124 in the processor hold an execution program bank value and a flag value, respectively, control the execution of instructions by the processor, and are updated in accordance with the execution results.

The AND element 135a outputs the update timing signal to the bank status holding FLIP-FLOP (FF) 123 only when the handover of the bank status is enabled by the setting register 131, and the bank status holding FLIP-FLOP (FF) 123 reads in the input value of bank status notification upon receiving the timing signal.

The AND element 135b outputs the update timing signal to the flag status holding FLIP-FLOP (FF) 124 only when the handover of the flag status is enabled by the setting register 131, and the flag status holding FLIP-FLOP (FF) 124 reads in the input value of flag status notification upon receiving the timing signal.

Thus, whether the handover should be performed or not is set in the setting register 131 from outside, and the updating of the status flip-flops in synchronism with the packet timing signal is masked or enabled in accordance with the settings. This arrangement permits selective handover of the internal information, whereby the packet processing can be performed more properly.

As described above, in the packet processing device 1 according to the present invention, a plurality of processors are connected in series and internal information handover control is performed to permit the processing to be executed separately by the processors.

It is therefore possible to restrain the overhead accompanying the handover of process between processors. Also, where the allowable processing time per processor is short, the number of processors used may be increased in accordance with the present invention, whereby packets can be processed while maintaining the packet processing throughput.

In the first to sixth embodiments described above, all of the internal information is handed over, but only part of the information may be handed over instead.

As described above, the packet processing device of the present invention is configured such that information in a packet processor is handed over as internal information between packet processors connected in series, to perform packet computation. This makes it possible to restrain the overhead and to process packets at high speed.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

U.S. application Ser. No. 09/587,529 is hereby incorporated herein by reference.

What is claimed is:

1. A packet processing device for processing packets, comprising:

a plurality of packet processors each including packet input means to which a packet is input, internal information handover means for handing over internal information transmitted from a preceding-stage packet processor, and also transmitting the internal information of its corresponding processor to a succeeding-stage packet processor, wherein the internal information is not parameters which are generated by converting the internal status, but denotes information directly indicative of the internal execution status of the packet processor, packet computing means for computing the input packet in accordance with the internal information, and packet output means for outputting the computed packet; and a communication line connecting said packet processors in series.

2. The packet processing device according to claim 1, wherein said internal information handover means hands over a value of a status flag as the internal information.

3. The packet processing device according to claim 1, wherein said internal information handover means hands over, as the internal information, address information of a program bank storing a packet processing program.

4. The packet processing device according to claim 1, wherein said internal information handover means hands over, as the internal information, a computation result stored in a local register.

5. The packet processing device according to claim 1, wherein said internal information handover means sets handover timing for the internal information.

6. The packet processing device according to claim 1, wherein said internal information handover means selectively hands over the internal information.

7. A packet processor for processing packets, comprising:

packet input means to which a packet is input;

internal information handover means for handing over internal information transmitted from a preceding-stage packet processor, and also transmitting the internal information of its corresponding processor to a succeeding-stage packet processor;

wherein the internal information is not parameters which are generated by converting the internal status, but denotes information directly indicative of the internal execution status of the packet processor;

packet computing means for computing the input packet in accordance with the internal information; and packet output means for outputting the computed packet.

* * * * *